United States Patent [19]

Gupta et al.

[11] Patent Number: 4,593,060

[45] Date of Patent: Jun. 3, 1986

[54] SMOKE RETARDANT POLYVINYL HALIDE COMPOSITIONS

[75] Inventors: Manoj K. Gupta; Gideon Salee, both of Williamsville, N.Y.

[73] Assignee: Occidental Chemical Corporation, Niagara Falls, N.Y.

[21] Appl. No.: 724,141

[22] Filed: Apr. 17, 1985

[51] Int. Cl.$^4$ ................................................. C08K 5/09
[52] U.S. Cl. .................... 524/397; 524/400; 524/432; 524/433
[58] Field of Search ............... 524/397, 400, 432, 433; 260/DIG. 24

[56] References Cited

U.S. PATENT DOCUMENTS

| | | | |
|---|---|---|---|
| 2,483,959 | 10/1949 | Baer . | |
| 2,960,490 | 11/1960 | Hinkes | 524/397 |
| 3,642,677 | 2/1972 | Brecker et al. | 524/397 |
| 3,729,436 | 4/1973 | Phillips | 524/397 |
| 3,853,811 | 12/1974 | Chandrasekaran | 524/395 |
| 3,870,679 | 3/1975 | Mitchell et al. | 524/398 |
| 3,951,894 | 4/1976 | Whelan | 524/399 |
| 3,965,068 | 6/1976 | Dickens | 524/398 |
| 3,983,185 | 9/1976 | Dorfman et al. | 524/399 |
| 4,002,597 | 1/1977 | Dickens . | |
| 4,053,453 | 10/1977 | McRowe et al. | 524/398 |
| 4,079,033 | 3/1978 | Oswitch et al. | 524/397 |
| 4,096,116 | 6/1978 | Lawson | 524/398 |

FOREIGN PATENT DOCUMENTS 1425972 12/1965 France .
2236893 7/1975 France .

*Primary Examiner*—Veronica P. Hoke
*Attorney, Agent, or Firm*—James F. Tao; James F. Mudd; Arthur S. Cookfair

[57] ABSTRACT

Smoke retardant compositions comprise a polyvinyl halide resin and a smoke retardant proportion of tin oxalate or calcium oxalate. Small amounts of zinc oxide, magnesium oxide or titanium oxide can also be included to provide cost effective smoke and fire retardant compositions. In flexible compositions a fire retardant additive such as aluminum trihydrate is used.

22 Claims, No Drawings

SMOKE RETARDANT POLYVINYL HALIDE COMPOSITIONS

BACKGROUND OF THE INVENTION AND PRIOR ART STATEMENT

Vinyl halide polymers, both rigid and flexible vinyl chloride polymers, are being used increasingly in the construction industry, as well as in fabrics, wall coverings and upholstery materials. As a result of recent hotel and high rise apartment building fires, there is a need that these materials be modified to reduce the amount of smoke evolved and to improve their fire retarding characteristics in the event of a fire.

Accordingly, many additives and combinations of additives have been added and proposed by the prior art in an attempt to improve the fire and smoke retardant characteristics of vinyl halide polymers.

In U.S. Pat. No. 3,644,589, Moore et al disclose that the self-extinguishing properties of impact-modified polyvinyl chloride can be improved by inclusion in the compositions of selected tin compounds, namely, organotin maleates, organotin mercaptides, stannous oxide and mixtures thereof. Later, Kroenke in U.S. Pat. No. 4,055,537 disclosed that polyvinyl chloride can be rendered smoke retardant by incorporating therein a synergistic mixture of melamine molybdate with a host of metal oxides including stannic oxide.

Several prior art workers have suggested specific metal oxalates as additives which can be combined with other compounds to provide smoke retardant polyvinyl chloride. Thus, Dickens in U.S. Pat. No. 3,965,068 disclosed fire retarding polyvinyl chloride with a synergistic mixture of selected nickel compound and selected zinc compounds including zinc oxalate.

In U.S. Pat. No. 3,968,081, Dickens disclosed that polyvinyl chloride can be smoke retarded by the inclusion of a synergistic mixture of vanadium pentoxide and selected nickel compounds including nickel oxalate. Kroenke in U.S. Pat. No. 4,053,454 disclosed that PVC can be rendered smoke retardant by the incorporation therein of a synergistic mixture of a melamine molybdate and selected nickel compounds including nickel (II) oxalate.

McRowe et al in U.S. Pat. Nos. 4,054,453 and 4,507,414 disclosed that smoke generation can be suppressed in polyvinyl chloride by the incorporation therein of copper oxalate and amine molybdates, such as melamine molybdates. Later, Brown in U.S. Pat. No. 4,464,495 disclosed that polyvinyl chlorides that had been rendered smoke retardant by the inclusion of copper oxalate and amine molybdates can be further improved by the addition of alkaline earth metal carbonates, titanium dioxide and aluminum trihydrate.

Dorfman et al in U.S. Pat. No. 4,013,815 suggest the use of ferric oxalate in halogenated polyesters, but not in polyvinyl chloride.

The oxalates of nickel, copper and zinc are too expensive to include in polyvinyl chloride compositions. They also suffer the disadvantage of requiring expensive or exotic additives in synergistic combinations. Moreover, copper oxalate is blue-white, and nickel oxalate is light green, and hence may adversely color the products containing them.

Accordingly, it is an object of this invention to provide polyvinyl halide compositions having improved smoke retarding characteristics by the inclusion of inexpensive additives which do not require the use of expensive or exotic synergistic compounds. It is a further object of the invention to provide flame retardant polyvinyl halide compositions, for applications, both rigid and flexible, which have improved smoke retarding properties.

A further object of the invention is to provide in a cost effective manner, colorless to white, transparent or translucent polyvinyl chloride compositions having improved flame retarding properties and reduced smoke generating characteristics.

Further objects of the invention will become apparent upon consideration of the following specification.

SUMMARY OF THE INVENTION

In accordance with one aspect of this invention, there are provided smoke retardant polyvinyl halide compositions comprising a polyvinyl halide and tin oxalate. Small amounts of zinc oxide, magnesium oxide or mixtures thereof can be included in the composition to further enhance their smoke retarding characteristics. The foregoing additives can be employed in either rigid compositions or flexible compositions containing plasticizers. In the case of flexible compositions, alumina trihydrate can also be incorporated to further enhance the flame retardancy of the flexible polyvinyl halide compositions.

In accordance with a further aspect of the invention, there are provided smoke retardant polyvinyl halide compositions comprising a polyvinyl halide and calcium oxalate. Small amounts of zinc oxide, titanium oxide or mixtures thereof can be included in the composition to further enhance their smoke retarding characteristics. The foregoing additives can be employed in either rigid compositions or flexible compositions containing plasticizers. In the case of flexible compositions, alumina trihydrate can also be incorporated to further enhance the flame retardancy of the flexible polyvinyl halide compositions.

The compositions of the invention involve the use of additives that are comparatively inexpensive and commercially available. The additives do not darken the vinyl halide polymers and do not cause any known toxic or environmental problems. Use of the additives enjoy a very good cost performance ratio. The compositions of the invention have good thermal stability and do not deteriorate the valuable properties of the vinyl halide compositions. The additives of the invention can be employed in both rigid and flexible polyvinyl halides formulations.

DESCRIPTION OF THE PREFERRED EMBODIMENTS OF THE INVENTION

The polyvinyl halides useful in the practice of this invention include polyvinyl halide homopolymers, copolymers and graft copolymers, made by any suitable process, such as suspension, emulsion and bulk or mass polymerization methods. The vinyl halide copolymers include copolymers of vinyl chloride and ethylenically unsaturated comonomers, which are generally employed in proportions which provide at least 50 weight percent of vinyl halide. Vinyl chloride is the preferred vinyl halide, but vinyl fluoride and vinyl bromide can also be used. Typical ethylenically unsaturated monomers, and useful graft copolymers are disclosed in U.S. Pat. No. 4,071,582 and U.S. pending application Ser. No. 541,191, filed Oct. 12, 1983, the disclosures of which are incorporated herein by reference.

In compositions of the invention containing tin oxalate, the tin oxalate is used in a proportion of about 0.1 to about 10 parts per 100 of polyvinyl halide resin (phr), preferably in a proportion of about 0.3 to about 3 phr. In these compositions, zinc oxide can be beneficially employed in a range up to about 5 phr, preferably about 0.01 to 5 phr, more preferably about 0.05 to 5 phr. Magnesium oxide can be beneficially employed in the range up to about 20 phr, preferably about 1 to 20 phr, more preferably about 1 to 10 phr.

In compositions of the invention containing calcium oxalate, the calcium oxalate is used in a proportion of about 0.1 to greater than about 50 phr. Greater proportions may be employed for smoke reduction, but are generally not preferred for economic reasons. Calcium oxalate is preferably employed in the range of about 0.3 to about 25 phr. In these compositions either zinc oxide or titanium oxide can be beneficially employed in proportions up to about 5 phr, preferably about 0.01 to about 5, and more preferably about 0.05 to about 5 phr.

In flexible compositions of the invention, components such as magnesium carbonate, magnesium hydroxide, clay, calcium carbonate, calcium hydroxide, aluminum trihydrate or talc can be used in proportions up to 100 phr. However, aluminum trihydrate is preferred in a proportion of about 15 to about 20 phr.

The compositions of the invention are prepared by blending the polyvinyl halide resin in particulate form, usually in powdered form with the smoke retarding agents and other desired additives, such as fillers, stabilizers, lubricants and the like in a suitable mixer such as Henschel mixer to produce a resin compound. In the case of formulations for use in making flexible products, plasticizers are added in a mixer or on a roll mill. The compound is then processed in commercial equipment such as extruders, calendering, and molding equipment to produce the desired plastic articles.

Testing Procedures

Test samples of the invention were prepared by first mixing the polyvinyl halide in powder form with the desired thermal stabilizers and lubricants in a Henschel mixer to provide pre-blend powder. For rigid formulations, the pre-blend powder and the smoke retarding additives of the invention were mixed in a ball mill for homogeneous mixing. For flexible PVC formulations, the smoke retarding additives were mixed with a suitable plasticizer and then the pre-blend powder was added to the plasticizer-additive mixture. The resulting mixtures were then roll milled on a Farrell mill for about three minutes at a temperature of 340° F. Finally, samples were compression molded in a Carver Press at a temperature of 350° F. for about 2.5 minutes at about 2,000 lbs. and for about 2.5 minutes at 30,000 lbs. The resulting specimens were then cooled under 5,000 lbs. pressure.

Samples of the compositions of the invention prepared in accordance with the foregoing procedure were tested for percent smoke and percent char using an Arapahoe smoke chamber consisting of a cylindrical combustion chamber 5" in diameter mounted vertically with an ignition orifice at its lower edge measuring 2.5" wide and 2.25" high. The sample (1.5"×0.5"×0.125" in size) was supported horizontally 1.75" from the bottom. The flame source was a micro-Bunsen burner fired with 60 cc per minute of propane (1.67 BTU per minute heat flux). It was positioned so that the tip of the inner blue cone impinged the lower edge of the example at a 210° angle. The combustion chamber was fitted with a 3" diameter by 24" high chimney to cool the combustion gases. These gases and entrained smoke then impinged on a filter paper which covered the orifice of a high power vacuum source. The velocity at the ignition orifice was 180 feet/minute, in the chamber it was 50 feet/minute, and in the chimney it was 145 feet/minute. These conditions were sufficient to entrain all the smoke produced during combustion and provides efficient collection on the filter paper.

The flame exposure for all tests was 30 seconds with the vacuum source turned on five seconds before the flame exposure and turned off 30 seconds after the flame was removed (and sample extinguished if necessary).

The sample was weighed before and after flame exposure and the loss of volatile products recorded. The filter paper was weighed before and after and smoke weight recorded. The sample then was mechanically debrised of char, using a sand mill (inclined 45° from the horizontal and rotating at 60 rpm) and reweighed.

The amount involved in combustion was the net difference between the initial sample weight and final weight after char removal. Char weight was the difference between intermediate and final sample weight.

Smoke weight and char weight were then reduced to percentages by division by the amount involved in combustion×100. In accordance with this test, a lower smoke % index and a high char % index are desirable.

The compositions were also identically tested for smoke generation using an NBS smoke chamber according to procedures described in ASTM E-662-79 entitled, "Test for Specific Optical Density of Smoke Generated by Solid Materials". Typically, test panels having dimensions of 3 inch×3 inch and either 0.0625 or 0.125 inch in thickness, were vertically disintegrated in a specimen holder by means of a radiant heater (heat intensity of 2.5 W/cm$^2$ on the surface of the specimen) and an ignition flame. The amount of evolving smoke was determined by means of an optical measuring system which also was conventional in nature.

Maximum smoke density (Dm) is a dimensionless number and has the advantage of representing a smoke density independent of chamber volume, specimen size or photometer path length, provided a consistent dimensional system is used. Percent smoke reduction is calculated using the equation:

$$\frac{Dm/g \text{ of control} - Dm/g \text{ of sample}}{Dm/g \text{ of control}} \times 100$$

The term "Dm/g" means maximum smoke density per gram of test sample. Dm and other aspects of physical optics of light transmission through smoke are discussed in more detail in the aforesaid ASTM testing procedure.

The examples indicating the characteristic value for flammability and the liquid oxygen index value (LOI) were measured according to the procedures described in ASTM D2863-77 (NOTE: higher LOI indicates improved flame retardancy). The LOI value was the conventional value used indicating the oxygen concentration at which a test rod having a thickness of 0.5 inch, a width of 0.125 inch and a length of 5 inches or longer continues spontaneous burning after an initial ignition for a period of at least 3 minutes. After the 3-minute time limit was reached, no more than an additional 2 inches of the rod was allowed to burn.

The Examples

The following examples further illustrate the various aspects of the invention but are not intended to limit it. Various modifications can be made in the invention without departing from the spirit and scope thereof. Where not otherwise specified in the specifications and claims, temperatures are given in degrees Centigrade, and all parts and percentages are by weight.

In these examples, where rigid PVC formulations are prepared, a master batch of polyvinyl chloride was prepared by mixing a thermal stabilizer, processing aid and various lubricants, as shown in the tables following the example, in a Henschel mixer. Then the smoke retarding additives were separately weighed and mixed by shaking. The resulting smoke retarding additive mixture was then added to the polyvinyl chloride powder mixture from the master batch, and the resulting mixture was mixed in a ball mill. The final mixture was then roll milled on a Farrell mill for about 3 minutes at 340° F. Thereafter, samples of the composition were compression molded in the form of plaques measuring 6 inches by 6 inches by 0.125 inch thick in a Carver Press at 350° F. for about 2.5 minutes at 2,000 lbs. and another 2.5 minutes at 30,000 lbs. pressure. The plaques were then cooled under 5,000 lbs. of pressure.

Flexible PVC samples were prepared by making a masterbatch of polyvinyl chloride with thermal stabilizers and lubricants, as shown in the tables following the examples, in a Henschel mixer. Smoke retardant additives were separately weighed and mixed by shaking. This mixture was then added to dioctyl phthalate plasticizer and handmixed. Polyvinyl chloride from the masterbatch was then added to the plasticizer, additive mix and once again handmixed.

In these examples, the tin oxalate employed is the commercially available stannous oxalate, wherein tin has a valence of two.

EXAMPLES 1-9

Samples of rigid polyvinyl chloride compositions containing the components indicated in Table I were prepared and tested using the Arapahoe test procedure. The data in Table I show the effect of tin oxalate, zinc oxide and magnesium oxide on smoke and char formation in rigid polyvinyl chloride. Test samples were prepared as bars measuring 1.5 inch×0.5 inch×0.125 inch. The test bars were tested in accordance with the above-described Arapahoe test.

Example 1 is a control with no smoke suppressants and is used as a reference to calculate the improvement in char formation and smoke reduction due to smoke suppressants. Examples 2 and 3 show the effect of ZnO and MgO on the smoke and char formation. In examples 4 through 6, one of the metal oxalates of this invention, tin oxalate, was used at varying concentrations. It is evident that increasing the concentration of tin oxalate from 0.6 to 2.0 phr improves the smoke reduction properties. Example 7 shows that a combination of 0.1 phr ZnO and 1.0 phr tin oxalate is better than either 0.1 phr ZnO or 1.0 phr tin oxalate. The addition of MgO, as shown in Example 8, further improves the smoke reduction. It is clear on a comparison of Examples 3, 7, 8 that a mixture of tin oxalate, zinc oxide and magnesium oxide gives best smoke reduction, compared to either of these used individually. The combination in Example 9 has a lower smoke reduction compared to Example 8 but the latter is very cost effective.

EXAMPLES 10-15

Additional rigid samples were prepared using the proportions of tin oxalate, zinc oxide and magnesium oxide shown in Table II. Test specimens were prepared and tested for smoke density in the NBS smoke density chamber described above. In this series of examples, example 10 is the control used as a reference for the NBS chamber to calculate percent smoke reduction. Example 11 shows that 1.0 phr ZnO reduces the smoke by 50 percent, but 57 percent smoke reduction can be achieved by using a combination of ZnO and tin oxalate (Example 12). On the other hand 1.1 phr tin oxalate reduces only 46 percent smoke (Example 13). Using an excess amount of tin oxalate is not very helpful either, in Example 15, 20 phr tin oxalate reduces only 45 percent smoke. Example 14 shows that a combination of tin oxalate, zinc oxide and magnesium oxide is a very effective smoke suppressant. This is in agreement with the Arapahoe tests described in an earlier section (see Example 8).

EXAMPLES 15A-15D

Additional rigid samples were prepared using the proportions of tin oxalate shown in 2A. Test specimens were prepared and tested for smoke density in the NBS smoke density chamber described above. In this series of examples, Example 15A is the control used as a reference for the NBS chamber to calculate percent smoke reduction. Examples 15B to 15D show that increasing proportions of tin oxalate has negligible effect on smoke reduction. The values are consistent with those shown in Examples 13 and 15 for 1.1 and 20 parts of tin oxalate.

EXAMPLE 16-20

Additional rigid PVC compositions were prepared to show the effect of the use of calcium oxalate, zinc oxide and titanium oxide. Compositions were prepared in accordance with the proportions shown in Table 3 and were tested by the Arapahoe test and with the NBS smoke chamber. Example 16 is used as a control which provides a reference for percent smoke reduction. It is evident from Examples 17 and 17a that calcium oxalate by itself is not very effective as a smoke suppressant when used at lower concentrations. It is clear from Examples 18 and 19 that a mixture of calcium oxalate and zinc oxide is better than either used individually. From Example 20, it is again evident that addition of titanium oxide improves the smoke reduction properties.

EXAMPLES 20A-20J

Additional examples of rigid PVC formulations were prepared using various proportions of calcium oxalate as shown in Table IIIA. In this series of examples, Example 20A is the control used as a reference for the NBS chamber to calculate smoke reduction.

EXAMPLES 21-23

Additional rigid PVC compositions were prepared with the proportions shown in Table 4. Examples 21 through 23 show the effect of various additives on the physical properties such as tensile and flexural strengths and modulii, notched izod impact strength and heat distortion temperature at 264 psi. All the tests were done as described in the ASTM books, and tests are also described in Table 4. Example 21 is a control and was used as a reference whereas Examples 22 and 23 show the effect of tin oxalate and tin oxalate, zinc oxide and magnesium oxide. It is evident from Example 23 that an improvement in tensile and flexural modulii and heat distortion temperature is observed, on the addition of tin oxalate, zinc oxide and magnesium oxide.

EXAMPLES 24-27

In this series of examples, the effectiveness of the smoke suppressants of the invention were tested in flexible polyvinyl chloride. Example 24 is a flexible PVC formulation with no smoke suppressant and is used as a reference for the calculation of percent smoke reduction. Example 25 shows that the addition of aluminum trihydrate reduces the smoke by only 9 percent. Example 26 shows that on addition of 7.3 phr tin oxalate to PVC, aluminum trihydrate mixture reduces the smoke by 44 percent. The smoke reduction can further be improved by using a combination of tin oxalate, zinc oxide and magnesium oxide, as shown in Example 27, which has a smoke reduction of 57 percent.

EXAMPLES 28-35

Table 5 summarizes the thermal stability tests for rigid PVC and PVC-smoke suppressant mixtures using Brabender test. Examples 28, 31 and 33 are three different controls with either different type or concentration of stabilizers. Example 28 and 31 have tin stabilizer but at 2 and 3 phr whereas Example 33 has a lead based stabilizer at 3 phr. In most cases, the presence of additives (Examples 30, 32, 34, 35) reduces the decomposition time, however the decomposition times are well above the practical time limit of 8-10 minutes and do not pose any threat to the practicality of this invention.

TABLE II-continued

| NBS Test on Rigid PVC Formulations Containing Tin Oxalate | | | | | | |
|---|---|---|---|---|---|---|
| Example | 10 | 11 | 12 | 13 | 14 | 15 |
| Reduction | | | | | | |

*B-22 PVC with 3 phr Tribase XL (tribasic lead sulfate stabilizer manufactured by Associated Lead), and the following commercial lubricants: Plastiflow LPC and Plastiflow CW$_2$ (manufactured by National Lead Company), Loxiol-G70 and Loxiol G30 (manufactured by Henkel) and stearic acid.

TABLE IIA

| NBS Test on Rigid PVC Formulations Containing Tin Oxalate | | | | |
|---|---|---|---|---|
| Example | 15A | 15B | 15C | 15D |
| PVC* | 100 | 100 | 100 | 100 |
| Tin Oxalate | — | 3.0 | 5.0 | 10.0 |
| D m/g | 54.2 | 30.5 | 30.8 | 29.5 |
| Percent Smoke Reduction | — | 43.7 | 43.2 | 45.6 |

*B-22 PVC with 3 phr of the lead stabilizer and other lubricants listed in Table II.

TABLE III

| Smoke Test on Rigid PVC Formulations Containing Calcium Oxalate | | | | | |
|---|---|---|---|---|---|
| Example | 16 | 17 | 18 | 19 | 20 |
| PVC* | 100 | 100 | 100 | 100 | 100 |
| Zinc Oxide | — | — | 0.2 | 0.2 | 0.2 |
| Calcium Oxalate | — | 2.2 | — | 2.0 | 2.0 |
| Titanium Dioxide | — | — | — | — | 2.0 |
| Percent Smoke | 12.0 | 10.6 | 6.2 | 5.4 | 5.2 |
| Percent Char | 10.5 | 14.4 | 23 | 25.1 | 28.5 |
| Percent Smoke Reduction (Arapahoe) | — | 11.7 | 49 | 55 | 57 |
| Dm/g | 60 | 54.4 | 28.3 | 25.1 | 21.6 |
| Percent Smoke Reduction (NBS Smoke Test) | — | 10 | 53 | 58 | 64 |

*B-22 PVC with 3 phr of the lead stabilizer anicants listed in Table II.

TABLE I

| Arapahoe Test on Rigid PVC Formulations Containing Tin Oxalate | | | | | | | | | |
|---|---|---|---|---|---|---|---|---|---|
| Example | 1 | 2 | 3 | 4 | 5 | 6 | 7 | 8 | 9 |
| PVC* | 100 | 100 | 100 | 100 | 100 | 100 | 100 | 100 | 100 |
| Zinc Oxide | — | 0.1 | 0.1 | — | — | — | 0.1 | 0.1 | 0.35 |
| Magnesium Oxide | — | — | 5.0 | — | — | — | — | 5.0 | 3.0 |
| Tin Oxalate | — | — | — | 0.6 | 1.0 | 2.0 | 1.0 | 1.0 | 0.60 |
| Percent Smoke | 9.95 | 5.47 | 5.52 | 5.47 | 4.47 | 4.32 | 4.43 | 3.55 | 3.69 |
| Percent Char | 6.83 | 16.2 | 23.2 | 21.7 | 22.4 | 24.7 | 30.5 | 22.2 | 30.4 |
| Percent Smoke Reduction | — | 45.0 | 44.5 | 45.0 | 52.1 | 56.6 | 55.5 | 64.3 | 62.9 |

*B-22 PVC, an injection grade PVC homopolymer manufactured by Occidental Chemical Corporation, was used with 2 phr M & T 31, organotin mercaptide stabilizer, manufactured by M & T Chemicals, Aldol MS (manufactured by Glyco Chemical) and calcium stearate commerical lubricants, and K120ND commercial processing agent (manufactured by Rohm & Hass Company).

TABLE IIIA

| NBS Test on Rigid PVC Formulations Containing Calcium Oxalate | | | | | | | | | | |
|---|---|---|---|---|---|---|---|---|---|---|
| Example | 20A | 20B | 20C | 20D | 20E | 20F | 20G | 20H | 20I | 20J |
| PVC* | 100 | 100 | 100 | 100 | 100 | 100 | 100 | 100 | 100 | 100 |
| Calcium Oxalate | — | 0.5 | 2.2 | 3 | 5 | 10 | 15 | 20 | 35 | 50 |
| D$_{m/g}$ | 55.7 | 51.3 | 50.9 | 47.2 | 45 | 48.5 | 49.3 | 38 | 35.6 | 32.5 |
| Percent Smoke Reduction | — | 8 | 9 | 15 | 19 | 13 | 11 | 32 | 36 | 42 |

*B-22 PVC with 3 phr of the lead stabilizer and other lubricants listed in Table II.

TABLE II

| NBS Test on Rigid PVC Formulations Containing Tin Oxalate | | | | | | |
|---|---|---|---|---|---|---|
| Example | 10 | 11 | 12 | 13 | 14 | 15 |
| PVC* | 100 | 100 | 100 | 100 | 100 | 100 |
| Zinc Oxide | — | 1.1 | 0.1 | — | 0.1 | — |
| Magnesium Oxide | — | — | — | — | 6.0 | — |
| Tin Oxalate | — | — | 1.0 | 1.1 | 1.0 | 20.0 |
| Dm/g | 60 | 30 | 25.9 | 32.5 | 24.8 | 32.9 |
| Percent Smoke | — | 50 | 57 | 46 | 59 | 45 |

TABLE IV

| Physical Properties of Low Smoke Rigid PVC Containing Tin Oxlate | | | |
|---|---|---|---|
| Example | 21 | 22 | 23 |
| PVC* | 100 | 100 | 100 |
| Tin Oxalate | — | 1.0 | 0.6 |
| Zinc Oxide | — | — | 0.35 |
| Magnesium Oxide | — | — | 3.0 |
| Tensile Strength × 10$^3$ psi | 7.94 | 7.86 | 7.84 |

TABLE IV-continued

Physical Properties of Low Smoke Rigid PVC Containing Tin Oxlate

| Example | 21 | 22 | 23 |
|---|---|---|---|
| ASTM D638 Tensile Modulus × $10^6$ psi | 0.49 | 0.50 | 0.51 |
| ASTM D638 Flexural Strength × $10^3$ psi | 14.3 | 14.1 | 14.2 |
| ASTM D790 Flexural Modulus × $10^6$ psi | 0.48 | 0.47 | 0.50 |
| ASTM D790 Impact Strength (ft-lb/inch) @ 23° C. | 0.56 | 0.41 | 0.50 |
| ASTM D256 Heat Distortion Temperature @ 264 psi ASTM D648 | 70 | 68 | 72 |

*B-22 PVC with 2 phr of the tin stabilizer and other lubricants listed in Table 1. The samples were injection molded as tensile and flexural bars.

TABLE V

NBS Test for Plasticized Flexible PVC Containing Tin Oxalate

| Example | 24 | 25 | 26 | 27 |
|---|---|---|---|---|
| PVC* | 100 | 100 | 100 | 100 |
| Di-octyl Phthalate | 60 | 60 | 60 | 60 |
| Aluminum Trihydrate | — | 20 | 20 | 20 |
| Tin Oxalate | — | — | 7.3 | 4.3 |
| Zinc Oxide | — | — | — | 0.1 |
| Magnesium Oxide | — | — | — | 5.0 |
| Dm/g | 78 | 70.6 | 43.8 | 33.4 |
| Percent Smoke Reduction | — | 9 | 44 | 57 |

*B-22 PVC with 3 phr of the lead stabilizer and other lubricants listed in Table II.

TABLE VI

Thermal Stability of Low Smoke Rigid PVC (Brabender Test) Containing Tin Oxalate or Calcium Oxalate

| Example | 28 | 29 | 30 | 31 | 32 | 33 | 34 | 35 |
|---|---|---|---|---|---|---|---|---|
| PVC* | 100 | 100 | 100 | 100 | 100 | 100 | 100 | 100 |
| Tin (II) Oxalate | — | 1 | 0.6 | — | — | — | — | — |
| Calcium Oxalate | — | — | — | — | 2.0 | — | 2.0 | 2.0 |
| Zinc Oxide | — | — | 0.35 | — | 0.2 | — | 0.2 | 0.2 |
| Magnesium Oxide | — | — | 3.0 | — | — | — | — | — |
| Titanium Dioxide | — | — | — | — | — | — | — | 2.0 |
| Fusion Time (seconds) | 15 | 15 | 75 | 35 | 30 | 60 | 60 | 60 |
| Equilibrium Torque (meter-gm) | 720 | 780 | 750 | 600 | 630 | 600 | 640 | 660 |
| Decomposition Time (minutes) | 16.5 | 16.8 | 12.5 | >20 | 14 | >20 | 12 | 11 |

*Examples 28-30 used B-22 with 2 phr of the tin stabilizer and other lubricants listed in Table 1.
*Examples 31 and 32 used B-22 PVC with 3 phr of the tin stabilizer and other lubricants listed in Table 1.
*Examples 33-35 used B-22 PVC with 3 phr of the lead stabilizer and other lubricants listed in Table II.

We claim:

1. A smoke retardant polymer composition comprising a polymer consisting essentially of a polyvinyl halide resin and a smoke retardant proportion of calcium oxalate or a tin compound consisting essentially of tin oxalate.

2. A smoke retardant polymer composition comprising a polyvinyl halide resin and a smoke retardant proportion of a tin compound consisting essentially of tin oxalate.

3. A smoke retardant polymer composition comprising a polyvinyl halide resin and a smoke retardant proportion of tin oxalate and zinc oxide.

4. A smoke retardant polymer composition comprising a polyvinyl halide resin and a smoke retardant proportion of tin oxalate, zinc oxide and magnesium oxide.

5. A rigid plastic article comprising the composition of claim 2.

6. A flexible plastic article comprising the composition of claim 2.

7. A smoke retardant polymer composition comprising a polyvinyl chloride resin and a smoke retardant proportion up to about 10 weight percent based on the weight of resin, of a tin compound consisting essentially of tin oxalate.

8. A smoke retardant polymer composition comprising a polyvinyl chloride resin and a smoke retarding proportion of about 0.3 to about 3 weight percent of tin oxalate and up to about 5 weight percent of zinc oxide based on the weight of resin.

9. A smoke retardant polymer composition comprising a polyvinyl chloride resin and a smoke retarding proportion of about 0.3 to about 3 weight percent tin oxalate, up to about 5 weight percent of zinc oxide, and up to about 20 weight percent of magnesium oxide.

10. A rigid plastic article comprising the composition of claim 7.

11. A flexible plastic article comprising the composition of claim 7.

12. The composition of claim 11 which also contains aluminum trihydrate.

13. The composition of claim 1 wherein the smoke retardant compound is calcium oxalate.

14. A smoke retardant polymer composition comprising a polyvinyl chloride resin and a smoke retardant proportion of calcium oxalate and zinc oxide.

15. A smoke retardant polymer composition comprising a polyvinyl chloride resin and a smoke retardant proportion of calcium oxalate, zinc oxide and magnesium oxide.

16. A rigid plastic article comprising the composition of claim 13.

17. A flexible plastic article comprising the composition of claim 13.

18. A smoke retardant polymer composition comprising a polymer consisting essentially of a polyvinyl chloride resin and a smoke retardant proportion up to about 50 weight percent of calcium oxalate based on the weight of resin.

19. A smoke retardant polymer composition comprising a polyvinyl chloride resin and a smoke retarding proportion of about 0.3 to about 25 weight percent of calcium oxalate and up to about 5 weight percent of zinc oxide based on the weight of resin.

20. A smoke retardant polymer composition comprising a polyvinyl chloride resin and a smoke retarding proportion of about 0.3 to about 25 weight percent calcium oxalate, up to about 5 weight percent of zinc oxide and up to about 5 weight percent of titanium oxide.

21. A rigid plastic article comprising the composition of claim 13.

22. A flexible plastic article comprising the composition of claim 13.

* * * * *